(12) United States Patent
Xiao

(10) Patent No.: US 11,393,413 B2
(45) Date of Patent: Jul. 19, 2022

(54) IMAGE BRIGHTNESS ADJUSTMENT METHOD, SYSTEM, AND COMPUTER-READABLE STORAGE MEDIUM

(71) Applicant: SHENZHEN SKYWORTH-RGB ELECTRONIC CO., LTD., Shenzhen (CN)

(72) Inventor: Zhilin Xiao, Shenzhen (CN)

(73) Assignee: SHENZHEN SKYWORTH-RGB ELECTRONIC CO., LTD., Shenzhen (CN)

( * ) Notice: Subject to any disclaimer, the term of this patent is extended or adjusted under 35 U.S.C. 154(b) by 54 days.

(21) Appl. No.: 16/772,956

(22) PCT Filed: Jul. 3, 2018

(86) PCT No.: PCT/CN2018/094187
§ 371 (c)(1),
(2) Date: Jun. 15, 2020

(87) PCT Pub. No.: WO2019/119772
PCT Pub. Date: Jun. 27, 2019

(65) Prior Publication Data
US 2021/0082354 A1  Mar. 18, 2021

(30) Foreign Application Priority Data
Dec. 19, 2017 (CN) .......................... 201711379981.5

(51) Int. Cl.
*G09G 3/34* (2006.01)

(52) U.S. Cl.
CPC ..... *G09G 3/342* (2013.01); *G09G 2320/0233* (2013.01); *G09G 2320/0626* (2013.01); *G09G 2360/147* (2013.01)

(58) Field of Classification Search
CPC .......... G09G 3/342; G09G 2320/0233; G09G 2320/0626; G09G 2360/147; H04N 5/208; H04N 5/57
See application file for complete search history.

(56) References Cited

U.S. PATENT DOCUMENTS

2005/0206776 A1  9/2005 Lee
2008/0100645 A1* 5/2008 Nitta .................... G09G 3/3426
345/690
(Continued)

FOREIGN PATENT DOCUMENTS

CN  102347015 A  2/2012
CN  103280174 A  * 9/2013
(Continued)

OTHER PUBLICATIONS

First Office Action in counterpart Chinese Patent Application No. 201711379981.5, dated Nov. 11, 2019.
(Continued)

*Primary Examiner* — Alexander Eisen
*Assistant Examiner* — Kebede T Teshome
(74) *Attorney, Agent, or Firm* — WestBridge IP LLC

(57) ABSTRACT

Disclosed are an image brightness adjustment method, an image brightness adjustment device, an image brightness adjustment system and a computer-readable storage medium. The method includes the steps of: subsequent to receiving an image signal to be displayed, performing noise reduction processing on the image signal to be displayed, and obtaining the image signal to be displayed after noise reduction; comparing the image signal to be displayed before noise reduction with the image signal to be displayed after noise reduction, and obtaining a signal-to-noise ratio; calculating a compensation intensity coefficient according to the signal-to-noise ratio, and determining an attribute value of each region of an image to be displayed; and adjusting a (Continued)

brightness of the image to be displayed according to the compensation intensity coefficient and the attribute value.

18 Claims, 2 Drawing Sheets

(56) References Cited

U.S. PATENT DOCUMENTS

| | | | |
|---|---|---|---|
| 2009/0232411 | A1 | 9/2009 | Chen et al. |
| 2011/0242139 | A1 | 10/2011 | Toshima et al. |
| 2016/0225301 | A1 | 8/2016 | Scepanovic et al. |
| 2018/0069999 | A1* | 3/2018 | Zhou .................... G09G 3/3426 |

FOREIGN PATENT DOCUMENTS

| | | |
|---|---|---|
| CN | 103280174 A | 9/2013 |
| CN | 103295553 A | 9/2013 |
| CN | 105654914 A | 6/2016 |
| CN | 105741789 A | 7/2016 |
| CN | 106297731 A | 1/2017 |
| CN | 107316615 A | 11/2017 |
| CN | 108012050 A | 5/2018 |

OTHER PUBLICATIONS

International Search Report in corresponding PCT Application No. PCT/CN2018/094187, dated Sep. 27, 2018.
Supplementary European Search Report in counterpart European Patent Application No. 18892978.8, dated Sep. 28, 2021.

\* cited by examiner

IMAGE BRIGHTNESS ADJUSTMENT METHOD, SYSTEM, AND COMPUTER-READABLE STORAGE MEDIUM

FIELD

The present application relates to the field of image processing technology, and in particular, to an image brightness adjustment method, an image brightness adjustment device, an image brightness adjustment system, and a computer-readable storage medium.

BACKGROUND

As users demand higher and higher image quality, many televisions use multi-region backlight to display images. The Local Dimming backlight module replaces the CCFL (Cold Cathode Fluorescent Lamp) backlight with a backlight composed of hundreds of LEDs (Light Emitting Diodes). The LEDs that compose the backlight can be adjusted according to the brightness of the image. The LED corresponding to the bright part of the displayed image can be adjusted to the maximum brightness, while the LED corresponding to the dark part of the displayed image can be reduced accordingly or even turned off to achieve the best contrast. However, the traditional Local Dimming technology will reduce the backlight brightness when the screen is dark, causing the subjective screen to become darker, making the visibility of the dark part worse.

At present, the method for solving the problem that the traditional Local Dimming technology will reduce the backlight brightness when the screen is dark, causing the subjective screen to become darker, making the visibility of the dark part worse is to compensate the data for Local Dimming. Specifically: detecting the maximum value of each pixel from the input image data, analyzing the maximum value of each pixel block by block, and determining the regional dimming value of each block according to the analysis result; calculating the first gain value by using the regional dimming value of each block; calculating the maximum gain value of each pixel taken as the second gain value by using the maximum value of each pixel; selecting a smaller value from the first gain value and the second gain value as the final gain value; compensating the input image data by using the final gain value; and controlling the brightness of the backlight unit block by block by using the regional dimming value of each block. However, this method will increase the noise in the dark part of the image, resulting in poor visual effect of the final displayed image.

SUMMARY

The main object of the present application is to provide an image brightness adjustment method, an image brightness adjustment device, an image brightness adjustment system, and a computer-readable storage medium, aiming to solve the technical problem that the noise in the dark part of the image becomes larger due to improper local dimming data compensation in the existing multi-region backlight control.

To achieve the above object, the present application provides an image brightness adjustment method, including the following steps:

subsequent to receiving an image signal to be displayed, performing noise reduction processing on the image signal to be displayed, and obtaining the image signal to be displayed after noise reduction;

comparing the image signal to be displayed before noise reduction with the image signal to be displayed after noise reduction, and obtaining a signal-to-noise ratio;

calculating a compensation intensity coefficient according to the signal-to-noise ratio, and determining an attribute value of each region of an image to be displayed; and adjusting a brightness of the image to be displayed according to the compensation intensity coefficient and the attribute value.

Preferably, the attribute value includes an original pixel brightness value of each region of the image to be displayed, a local backlight brightness value of each region of the image to be displayed, and a maximum backlight brightness value of each region of the image to be displayed.

Preferably, the step of adjusting a brightness of the image to be displayed according to the compensation intensity coefficient and the attribute value includes:

calculating a difference value between the maximum backlight brightness value and the local backlight brightness value;

calculating a brightness value to be compensated according to the difference value, the original pixel brightness value, the maximum backlight brightness value and the compensation intensity coefficient;

adding the brightness value to be compensated and the original pixel brightness value, and obtaining an adjusted brightness value of the image to be displayed; and adjusting the brightness of the image to be displayed according to the adjusted brightness value.

Preferably, in a determination that the attribute value is the local backlight brightness value, the step of determining an attribute value of each region of an image to be displayed includes:

determining the original pixel brightness value of each region of the image to be displayed; and determining the corresponding local backlight brightness value by the original pixel brightness value based on a pre-stored mapping table between the original pixel brightness value and the local backlight brightness value.

Preferably, the step of subsequent to receiving an image signal to be displayed, performing noise reduction processing on the image signal to be displayed, and obtaining the image signal to be displayed after noise reduction includes:

subsequent to receiving the image signal to be displayed, determining a type of the image signal to be displayed; and determining a corresponding noise reduction method according to the type, performing noise reduction processing on the image signal to be displayed, and obtaining the image signal to be displayed after noise reduction.

Preferably, the step of determining a corresponding noise reduction method according to the type, performing noise reduction processing on the image signal to be displayed, and obtaining the image signal to be displayed after noise reduction includes:

in a determination that the image signal to be displayed is an analog signal, performing noise reduction processing on the image signal to be displayed by low-pass filtering, and obtaining the analog signal after noise reduction; and converting the analog signal after noise reduction into a digital signal, performing noise reduction processing on the digital signal by wavelet transform filtering, and obtaining the image signal to be displayed after noise reduction.

Preferably, the step of determining a corresponding noise reduction method according to the type, performing noise reduction processing on the image signal to be displayed, and obtaining the image signal to be displayed after noise reduction includes:

in a determination that the image signal to be displayed is a digital signal, performing noise reduction processing on the image signal to be displayed by wavelet transform filtering, and obtaining the image signal to be displayed after noise reduction.

Preferably, subsequent to the step of adjusting a brightness of the image to be displayed according to the compensation intensity coefficient and the attribute value, the method further includes:

determining the adjusted local backlight brightness value according to the image to be displayed after adjusting the brightness, and displaying the image to be displayed according to the adjusted local backlight brightness value.

In addition, to achieve the above object, the present application further provides an image brightness adjustment device, including:

a processing module, configured to perform noise reduction processing on the image signal to be displayed and obtain the image signal to be displayed after noise reduction subsequent to receiving an image signal to be displayed;

a comparison module, configured to compare the image signal to be displayed before noise reduction with the image signal to be displayed after noise reduction, and obtain a signal-to-noise ratio;

a calculation module, configured to calculate a compensation intensity coefficient according to the signal-to-noise ratio;

a determination module, configured to determine an attribute value of each region of an image to be displayed; and an adjustment module, configured to adjust a brightness of the image to be displayed according to the compensation intensity coefficient and the attribute value.

In addition, in order to achieve the above object, the present application further provides an image brightness adjustment system, which includes a memory, a processor, and an image brightness adjustment program stored on the memory and executable on the processor, the image brightness adjustment program, when executed by the processor, implements the steps of the image brightness adjustment method described above.

In addition, in order to achieve the above object, the present application further provides a computer-readable storage medium on which an image brightness adjustment program is stored, and the image brightness adjustment program, when executed by a processor, implements the steps of the image brightness adjustment method described above.

In the present application, after the image signal to be displayed is received, noise reduction processing is performed on the image signal to be displayed, and the image signal to be displayed after noise reduction is obtained; the image signal to be displayed before noise reduction is compared with the image signal to be displayed after noise reduction, and the signal-to-noise ratio is obtained; the compensation intensity coefficient is calculated according to the signal-to-noise ratio, and the attribute value of each region of the image to be displayed is determined; the brightness of the image to be displayed is adjusted according to the compensation intensity coefficient and the attribute value. As a result, in the process of Local Dimming data compensation, the intensity of data compensation is adaptively adjusted through the signal-to-noise ratio, data compensation for the image with large noise is reduced, which avoids increasing noise in dark parts of the image; large data compensation is adopted for the image with small noise, which makes the details of the dark part of the image visible, so as to improve the quality of the image displayed on the television.

The implementation, functional characteristics and advantages of the present application will be further described in conjunction with the embodiments and with reference to the drawings.

DETAILED DESCRIPTION OF THE EMBODIMENTS

It should be understood that the specific embodiments described herein are only used to explain the present application, and are not intended to limit the present application.

The solution of the embodiments of the present application is mainly as follows: after an image signal to be displayed is received, noise reduction processing is performed on the image signal to be displayed, and an image signal to be displayed after noise reduction is obtained; the image signal to be displayed before noise reduction is compared with the image signal to be displayed after noise reduction, and a signal-to-noise ratio is obtained; a compensation intensity coefficient is calculated according to the signal-to-noise ratio, and an attribute value of each region of the image to be displayed is determined; a brightness of the image to be displayed is adjusted according to the compensation intensity coefficient and the attribute value, so as to solve the problem that noise in a dark part of the image becomes larger due to improper local dimming data compensation in the existing multi-region backlight control.

Figure 1:
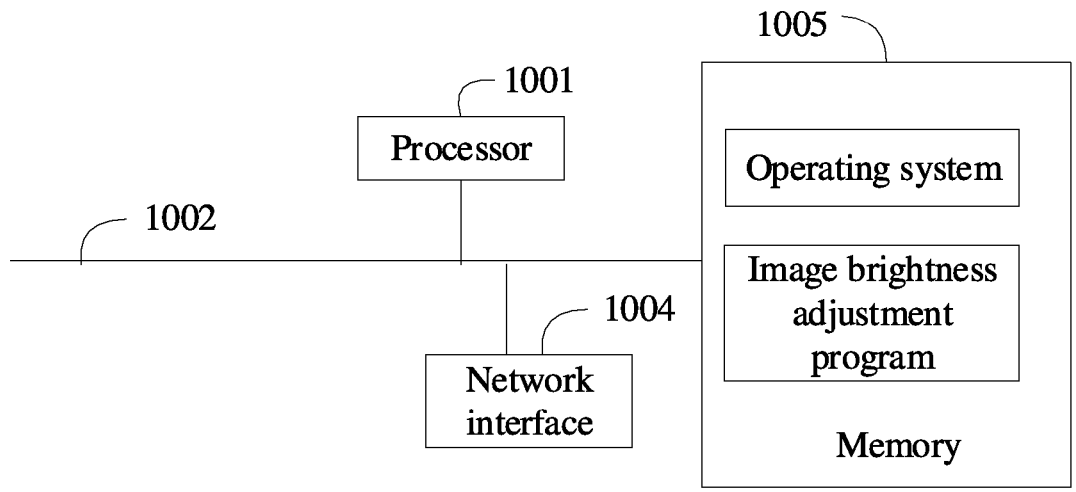
FIG. 1 is a schematic structural diagram of a hardware operating environment according to an embodiment of the present application.

As shown in FIG. 1, FIG. 1 is a schematic structural diagram of a hardware operating environment involved in an embodiment of the present application.

It should be noted that FIG. 1 is a schematic structural diagram of a hardware operating environment of an image brightness adjustment system. The image brightness adjustment system in the embodiment of the present application may be a terminal device such as a personal computer (PC), a portable computer, and a television.

As shown in FIG. 1, the image brightness adjustment system may include: a processor 1001, such as a CPU, a network interface 1004, a memory 1005, and a communication bus 1002. The communication bus 1002 is configured to implement connection communication between these components. The memory 1005 may be a high-speed RAM memory or a stable memory (non-volatile memory), such as a disk memory. The memory 1005 may optionally be a storage device independent of the foregoing processor 1001.

Optionally, the image brightness adjustment system may further include an RF (Radio Frequency) circuit, a sensor, a WiFi module, and so on.

Those skilled in the art may understand that the structure of the image brightness adjustment system shown in FIG. 1 does not constitute a limitation on the terminal, and more or less components than those illustrated may be included, or certain components may be combined, or different components may be arranged.

As shown in FIG. 1, the memory 1005 as a computer storage medium may include an operating system and an image brightness adjustment program. The operating system is a program that manages and controls the hardware and software resources of the image brightness adjustment system, and supports the operation of the image brightness adjustment program and other software or programs.

In the image brightness adjustment system shown in FIG. 1, the network interface 1004 is mainly configured to connect devices that send image signals to be displayed. The processor 1001 may be configured to call the image brightness adjustment program stored in the memory 1005 and perform the following operations:

subsequent to receiving an image signal to be displayed, performing noise reduction processing on the image signal to be displayed, and obtaining the image signal to be displayed after noise reduction;

comparing the image signal to be displayed before noise reduction with the image signal to be displayed after noise reduction, and obtaining a signal-to-noise ratio;

calculating a compensation intensity coefficient according to the signal-to-noise ratio, and determining an attribute value of each region of an image to be displayed; and adjusting a brightness of the image to be displayed according to the compensation intensity coefficient and the attribute value.

Further, the attribute value includes an original pixel brightness value of each region of the image to be displayed, a local backlight brightness value of each region of the image to be displayed, and a maximum backlight brightness value of each region of the image to be displayed.

Further, the step of adjusting a brightness of the image to be displayed according to the compensation intensity coefficient and the attribute value includes:

calculating a difference value between the maximum backlight brightness value and the local backlight brightness value;

calculating a brightness value to be compensated according to the difference value, the original pixel brightness value, the maximum backlight brightness value and the compensation intensity coefficient;

adding the brightness value to be compensated and the original pixel brightness value, and obtaining an adjusted brightness value of the image to be displayed; and adjusting the brightness of the image to be displayed according to the adjusted brightness value.

Further, in a determination that the attribute value is the local backlight brightness value, the step of determining an attribute value of each region of an image to be displayed includes:

determining the original pixel brightness value of each region of the image to be displayed; and determining the corresponding local backlight brightness value by the original pixel brightness value based on a pre-stored mapping table between the original pixel brightness value and the local backlight brightness value.

Further, the step of subsequent to receiving an image signal to be displayed, performing noise reduction processing on the image signal to be displayed, and obtaining the image signal to be displayed after noise reduction includes:

subsequent to receiving the image signal to be displayed, determining a type of the image signal to be displayed; and determining a corresponding noise reduction method according to the type, performing noise reduction processing on the image signal to be displayed, and obtaining the image signal to be displayed after noise reduction.

Further, the step of determining a corresponding noise reduction method according to the type, performing noise reduction processing on the image signal to be displayed, and obtaining the image signal to be displayed after noise reduction includes:

in a determination that the image signal to be displayed is an analog signal, performing noise reduction processing on the image signal to be displayed by low-pass filtering, and obtaining the analog signal after noise reduction; and converting the analog signal after noise reduction into a digital signal, performing noise reduction processing on the digital signal by wavelet transform filtering, and obtaining the image signal to be displayed after noise reduction.

Further, the step of determining a corresponding noise reduction method according to the type, performing noise reduction processing on the image signal to be displayed, and obtaining the image signal to be displayed after noise reduction includes:

in a determination that the image signal to be displayed is a digital signal, performing noise reduction processing on the image signal to be displayed by wavelet transform filtering, and obtaining the image signal to be displayed after noise reduction.

Further, subsequent to the step of adjusting a brightness of the image to be displayed according to the compensation intensity coefficient and the attribute value, the processor 1001 may also be configured to call the image brightness adjustment program stored in the memory 1005 and perform the following steps:

determining the adjusted local backlight brightness value according to the image to be displayed after adjusting the brightness, and displaying the image to be displayed according to the adjusted local backlight brightness value.

Based on the above hardware structures, various embodiments of the image brightness adjustment method are provided.

Figure 2:
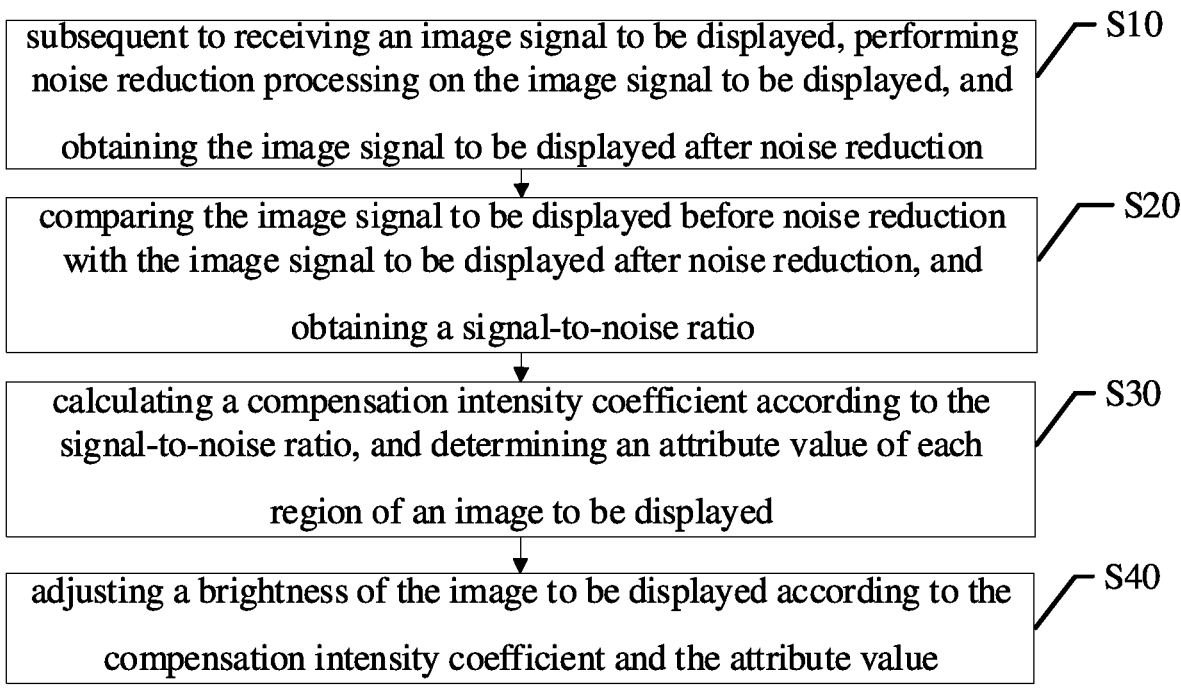
FIG. 2 is a schematic flowchart of an image brightness adjustment method according to a first embodiment of the present application.

Referring to FIG. 2, FIG. 2 is a schematic flowchart of an image brightness adjustment method according to a first embodiment of the present application.

In this embodiment, an embodiment of the image brightness adjustment method is provided. It should be noted that although the logic sequence is shown in the flowchart, in some cases, the steps shown or described may be performed in a sequence different from that shown here.

In this embodiment, the image brightness adjustment method may be optionally applied to the image brightness adjustment system. The following uses the image brightness adjustment system as a television as an example for description.

The image brightness adjustment method includes:

Step S10: subsequent to receiving an image signal to be displayed, performing noise reduction processing on the image signal to be displayed, and obtaining the image signal to be displayed after noise reduction.

Subsequent to receiving an image signal to be displayed, the television performs noise reduction processing on the image signal to be displayed to obtain the image signal to be displayed after noise reduction. The methods used for performing noise reduction processing on the image signal to be displayed may be low-pass filter noise reduction, wavelet transform filter noise reduction, etc. In the process of noise reduction using low-pass filtering, the image to be displayed may be smoothed and denoised by the low-pass filter, and the unnecessary frequencies in the image to be displayed may be filtered out, so as to achieve the effect of denoising. The process of noise reduction using wavelet transform filtering is as follows: (1) wavelet decomposition of the image signal to be displayed; (2) threshold quantization of high-frequency coefficients after hierarchical decomposition; (3) reconstruction of the image signal to be displayed using two-dimensional wavelet. It can be understood that mean filtering or median filtering may also be used to perform noise reduction processing on the image signal to be displayed.

Step S20: comparing the image signal to be displayed before noise reduction with the image signal to be displayed after noise reduction, and obtaining a signal-to-noise ratio.

After the television obtains the image to be displayed after noise reduction, the television compares the image signal to be displayed before noise reduction with the image signal to be displayed after noise reduction, and obtains a signal-to-noise ratio. The formula for calculating the SNR (Signal-Noise Ratio) is:

$$SNR = 10 * \lg\left(\sum_{i=1}^{N} \frac{y_i^2}{(x_i - y_i)^2}\right)$$

Where $y_i$ represents the image signal to be displayed before noise reduction, and $x_i$ represents the image signal to be displayed after noise reduction. It should be noted that the larger the value of the SNR, the better the quality of the image to be displayed, and the lower the noise of the image to be displayed; the smaller the value of the SNR, the worse the quality of the image to be displayed, and the greater the noise of the image to be displayed. In this embodiment, the range of the SNR is 10 to 98. The range of the SNR is an empirical value, which may be obtained through multiple experiments.

Step S30: calculating a compensation intensity coefficient according to the signal-to-noise ratio, and determining an attribute value of each region of an image to be displayed.

After the television calculates and obtains the SNR, the television calculates a compensation intensity coefficient according to the signal-to-noise ratio, and determines an attribute value of each region of an image to be displayed. In this embodiment, a is used to represent the compensation intensity coefficient, then, $$a = \frac{SNR}{100}$$

Since the range of the SNR in this embodiment is 10 to 98, the value range of the compensation intensity coefficient a is 0.1 to 0.98.

It should be noted that, in this embodiment, since the LED backlight of the television display screen is partitioned (for example, divided into M*N rectangular regions, M and N are both positive integers), therefore, the image to be displayed on the display screen is also partitioned correspondingly. The specific partition method is determined by the partition method of the LED backlight of the display screen. For example, when the LED backlight of the display screen is divided into 64 regions, the image to be displayed is correspondingly divided into 64 regions. The television acquires the attribute value of each region of the image to be displayed. The attribute value include, but is not limited to, an original pixel brightness value of each region of the image to be displayed, a local backlight brightness value of each region of the image to be displayed, and a maximum backlight brightness value of each region of the image to be displayed. The maximum backlight brightness value is the maximum backlight brightness value in the region, that is, the maximum backlight brightness value in the backlight module. The local backlight brightness value is the average backlight brightness value in the region. The original pixel brightness value is the average original pixel brightness value in the region.

Step S40: adjusting a brightness of the image to be displayed according to the compensation intensity coefficient and the attribute value.

After obtaining the compensation intensity coefficient and the attribute value, the television adjusts the brightness of the image to be displayed according to the compensation intensity coefficient and the attribute value.

Further, the step S40 includes:

Step a: calculating a difference value between the maximum backlight brightness value and the local backlight brightness value;

Step b: calculating a brightness value to be compensated according to the difference value, the original pixel brightness value, the maximum backlight brightness value and the compensation intensity coefficient;

Step c: adding the brightness value to be compensated and the original pixel brightness value, and obtaining an adjusted brightness value of the image to be displayed; and Step d: adjusting the brightness of the image to be displayed according to the adjusted brightness value.

Further, the specific process for the television to adjust the brightness of the image to be displayed according to the compensation intensity coefficient and the attribute value is as follows: the television calculates the difference value between the maximum backlight brightness value and the local backlight brightness value, and calculates the brightness value to be compensated according to the calculated difference value, the original pixel brightness value, the maximum backlight brightness value and the compensation intensity coefficient, and then adds the brightness value to be compensated and the original pixel brightness value to obtain the adjusted brightness value of the image to be displayed, and adjusts the brightness of the image to be displayed according to the adjusted brightness value. The specific calculation formula is:

$$Y = Y_0 + a \times \frac{(BL_{max} - BL_{DB}) \times Y_0}{BL_{max}}$$

Where Y represents the pixel brightness value of the image to be displayed after brightness adjustment, $Y_0$ represents the original pixel brightness value, $BL_{max}$ represents the maximum backlight brightness value in the backlight module, $BL_{DB}$ represents the local backlight brightness value, and a represents the compensation intensity coefficient.

Further, in a determination that the attribute value is the local backlight brightness value, the step of determining an attribute value of each region of an image to be displayed includes:

Step e: determining the original pixel brightness value of each region of the image to be displayed; and Step f: determining the corresponding local backlight brightness value by the original pixel brightness value based on a pre-stored mapping table between the original pixel brightness value and the local backlight brightness value.

Further, the process of determining the local backlight brightness value of each region of the image to be displayed is: determining the original pixel brightness value of each region in the image to be displayed, and obtaining the pre-stored mapping table between the original pixel brightness value and the local backlight brightness value in the memory of the television. According to the mapping table, the local backlight brightness value of the corresponding region is determined by the original pixel brightness value of the region. It can be understood that in the mapping table, there is a one-to-one correspondence between the original pixel brightness value and the local backlight brightness value of a certain region. After determining the original pixel brightness value of the region, the local backlight brightness value of the region may be correspondingly determined.

In the present embodiment, after the image signal to be displayed is received, noise reduction processing is performed on the image signal to be displayed, and the image signal to be displayed after noise reduction is obtained; the image signal to be displayed before noise reduction is compared with the image signal to be displayed after noise reduction, and the signal-to-noise ratio is obtained; the compensation intensity coefficient is calculated according to the signal-to-noise ratio, and the attribute value of each region of the image to be displayed is determined; the brightness of the image to be displayed is adjusted according to the compensation intensity coefficient and the attribute value. As a result, in the process of Local Dimming data compensation, the intensity of data compensation is adaptively adjusted through the signal-to-noise ratio, data compensation for the image with large noise is reduced, which avoids increasing noise in dark parts of the image; large data compensation is adopted for the image with small noise, which makes the details of the dark part of the image visible, so as to improve the quality of the image displayed on the television.

Further, a second embodiment of the image brightness adjustment method of the present application is provided.

Figure 3:
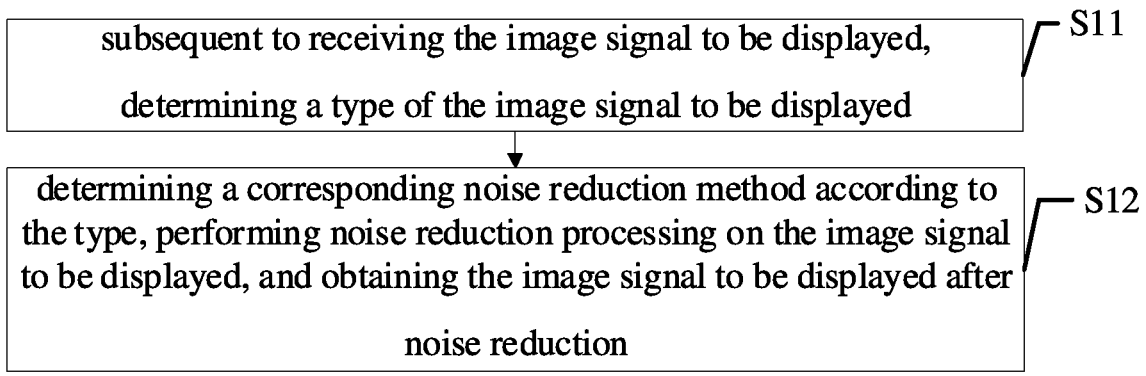
FIG. 3 is a schematic flow chart of subsequent to receiving an image signal to be displayed, performing noise reduction processing on the image signal to be displayed to obtain the image signal to be displayed after noise reduction according to an embodiment of the present application.

The difference between the second embodiment of the image brightness adjustment method and the first embodiment of the image brightness adjustment method is that, referring to FIG. 3, the step S10 includes:

Step S11: subsequent to receiving the image signal to be displayed, determining a type of the image signal to be displayed.

After receiving the image signal to be displayed, the television determines the type of image signal to be displayed, that is, the television determines whether the image signal to be displayed is a digital signal or an analog signal. Specifically, since the receiving channels of the digital signal and the analog signal received by the television are different, the television may determine whether the image signal to be displayed is a digital signal or an analog signal by the receiving channel that receives the image signal to be displayed. As in this embodiment, it may be determined that the image signal to be displayed sent from ATV (Asia Television Limited) is an analog signal, and the image signal to be displayed sent from HDMI (High Definition Multimedia Interface) is a digital signal.

Step S12: determining a corresponding noise reduction method according to the type, performing noise reduction processing on the image signal to be displayed, and obtaining the image signal to be displayed after noise reduction.

After the television determines the type of image signal to be displayed, the television determines the corresponding noise reduction method according to the type of the image signal to be displayed, and performs noise reduction processing on the image to be displayed according to the determined noise reduction method to obtain the image signal to be displayed after noise reduction. It should be noted that, in this embodiment, different noise reduction methods are set for different types of image signals to be displayed, for example, when the image signal to be displayed is a digital signal, wavelet transform filtering is used to perform noise reduction processing on the image to be displayed; when the image to be displayed is an analog signal, low-pass filtering is used to perform noise reduction processing on the image to be displayed.

Further, the step S12 includes:

Step g: in a determination that the image signal to be displayed is an analog signal, performing noise reduction processing on the image signal to be displayed by low-pass filtering, and obtaining the analog signal after noise reduction; and Step h, converting the analog signal after noise reduction into a digital signal, performing noise reduction processing on the digital signal by wavelet transform filtering, and obtaining the image signal to be displayed after noise reduction.

Further, if the television determines that the image to be displayed is an analog signal, the television performs noise reduction processing on the image signal to be displayed by using low-pass filtering to obtain the analog signal after noise reduction. After obtaining the analog signal after noise reduction, the television converts the analog signal after noise reduction into a digital signal, performs noise reduction processing on the digital signal by wavelet transform filtering, and obtains the image signal to be displayed after noise reduction.

Further, the step S12 further includes:

Step i, in a determination that the image signal to be displayed is a digital signal, performing noise reduction processing on the image signal to be displayed by wavelet transform filtering, and obtaining the image signal to be displayed after noise reduction.

Further, if the television determines that the image signal to be displayed is a digital signal, the television performs noise reduction processing on the image signal to be displayed by using wavelet transform filtering to obtain the image signal to be displayed after noise reduction.

In this embodiment, by determining the corresponding noise reduction method according to the type of the image signal to be displayed, the image signal to be displayed is subjected to noise reduction processing, so as to obtain the image signal to be displayed after noise reduction. Different noise reduction methods are implemented according to different types of signals to improve the noise reduction effect of the image to be displayed.

Further, a third embodiment of the image brightness adjustment method of the present application is provided.

Figure 4:
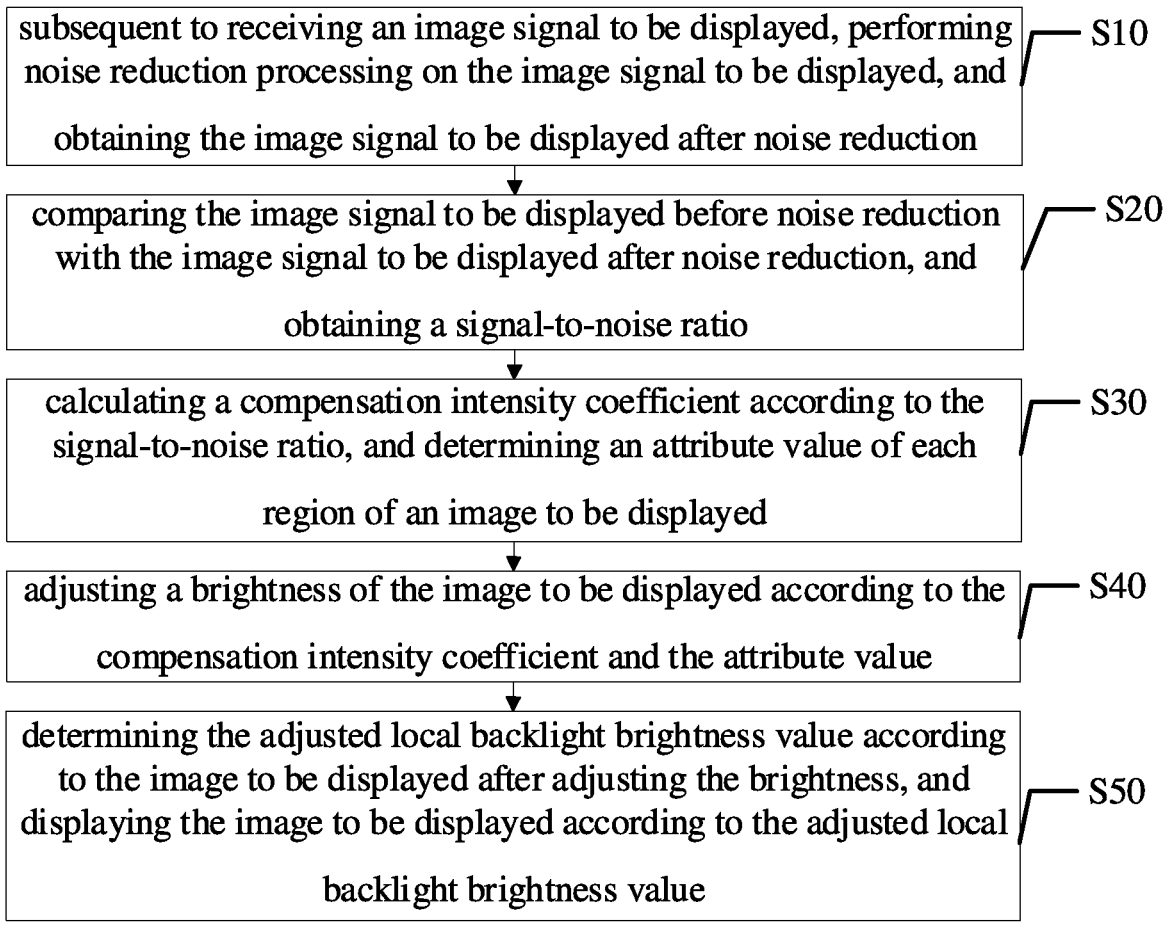
FIG. 4 is a schematic flowchart of the image brightness adjustment method according to a third embodiment of the present application.

The difference between the third embodiment of the image brightness adjustment method and the first embodiment or the second embodiment of the image brightness adjustment method is that, referring to FIG. 4, the image brightness adjustment method further includes:

Step S50: determining the adjusted local backlight brightness value according to the image to be displayed after adjusting the brightness, and displaying the image to be displayed according to the adjusted local backlight brightness value.

After obtaining the image to be displayed after adjusting the brightness, the television determines the pixel brightness value of each region in the image to be displayed after adjusting the brightness, determines the local backlight brightness value after adjusting the brightness by the pixel brightness value after adjusting the brightness based on the mapping table, and displays the image to be displayed on its display screen according to the local backlight brightness value after adjusting the brightness.

In this embodiment, the local backlight brightness value after adjusting the brightness is determined according to the image to be displayed after adjusting the brightness, and the image to be displayed is displayed according to the local backlight brightness value after adjusting the brightness, so that the dark noise of the image to be displayed is not enlarged and the dark details of the image to be displayed are visible during the process of displaying the image to be displayed on the television screen.

In addition, an embodiment of the present application further provides an image brightness adjustment device, including:

a processing module, configured to perform noise reduction processing on the image signal to be displayed and obtain the image signal to be displayed after noise reduction subsequent to receiving an image signal to be displayed;

a comparison module, configured to compare the image signal to be displayed before noise reduction with the image signal to be displayed after noise reduction, and obtain a signal-to-noise ratio;

a calculation module, configured to calculate a compensation intensity coefficient according to the signal-to-noise ratio;

a determination module, configured to determine an attribute value of each region of an image to be displayed; and an adjustment module, configured to adjust a brightness of the image to be displayed according to the compensation intensity coefficient and the attribute value.

Further, the attribute value includes an original pixel brightness value of each region of the image to be displayed, a local backlight brightness value of each region of the image to be displayed, and a maximum backlight brightness value of each region of the image to be displayed.

Further, the adjustment module includes:

a calculation unit, configured to calculate a difference value between the maximum backlight brightness value and the local backlight brightness value; and calculate a brightness value to be compensated according to the difference value, the original pixel brightness value, the maximum backlight brightness value and the compensation intensity coefficient;

an adding unit, configured to add the brightness value to be compensated and the original pixel brightness value, and obtain an adjusted brightness value of the image to be displayed; and an adjusting unit, configured to adjust the brightness of the image to be displayed according to the adjusted brightness value.

Further, in a determination that the attribute value is the local backlight brightness value, the determination module is further configured to determine the original pixel brightness value of each region of the image to be displayed; and determine the corresponding local backlight brightness value by the original pixel brightness value based on a pre-stored mapping table between the original pixel brightness value and the local backlight brightness value.

Further, the processing module includes:

a determining unit, configured to determine a type of the image signal to be displayed subsequent to receiving the image signal to be displayed; and a processing unit, configured to determine a corresponding noise reduction method according to the type, perform noise reduction processing on the image signal to be displayed, and obtain the image signal to be displayed after noise reduction.

Further, the processing unit is further configured to perform noise reduction processing on the image signal to be displayed by low-pass filtering and obtain the analog signal after noise reduction in a determination that the image signal to be displayed is an analog signal; convert the analog signal after noise reduction into a digital signal, perform noise reduction processing on the digital signal by wavelet transform filtering, and obtain the image signal to be displayed after noise reduction.

Further, the processing unit is further configured to perform noise reduction processing on the image signal to be displayed by wavelet transform filtering and obtain the image signal to be displayed after noise reduction in a determination that the image signal to be displayed is a digital signal.

Further, the adjustment module is further configured to determine the adjusted local backlight brightness value according to the image to be displayed after adjusting the brightness.

The image brightness adjustment device further includes:

a display module, configured to display the image to be displayed according to the adjusted local backlight brightness value.

The specific implementation of the image brightness adjustment device of the present application is basically the same as the above embodiments of the image brightness adjustment method, and details are not described herein again.

In addition, an embodiment of the present application further provides a computer-readable storage medium on which an image brightness adjustment program is stored. The image brightness adjustment program, when executed by a processor, implements the following steps:

subsequent to receiving an image signal to be displayed, performing noise reduction processing on the image signal to be displayed, and obtaining the image signal to be displayed after noise reduction;

comparing the image signal to be displayed before noise reduction with the image signal to be displayed after noise reduction, and obtaining a signal-to-noise ratio;

calculating a compensation intensity coefficient according to the signal-to-noise ratio, and determining an attribute value of each region of an image to be displayed; and adjusting a brightness of the image to be displayed according to the compensation intensity coefficient and the attribute value.

Further, the attribute value includes an original pixel brightness value of each region of the image to be displayed, a local backlight brightness value of each region of the image to be displayed, and a maximum backlight brightness value of each region of the image to be displayed.

Further, the step of adjusting a brightness of the image to be displayed according to the compensation intensity coefficient and the attribute value includes:

calculating a difference value between the maximum backlight brightness value and the local backlight brightness value;

calculating a brightness value to be compensated according to the difference value, the original pixel brightness value, the maximum backlight brightness value and the compensation intensity coefficient;

adding the brightness value to be compensated and the original pixel brightness value, and obtaining an adjusted brightness value of the image to be displayed; and adjusting the brightness of the image to be displayed according to the adjusted brightness value.

Further, in a determination that the attribute value is the local backlight brightness value, the step of determining an attribute value of each region of an image to be displayed includes:

determining the original pixel brightness value of each region of the image to be displayed; and determining the corresponding local backlight brightness value by the original pixel brightness value based on a pre-stored mapping table between the original pixel brightness value and the local backlight brightness value.

Further, the step of subsequent to receiving an image signal to be displayed, performing noise reduction processing on the image signal to be displayed, and obtaining the image signal to be displayed after noise reduction includes:

subsequent to receiving the image signal to be displayed, determining a type of the image signal to be displayed; and determining a corresponding noise reduction method according to the type, performing noise reduction processing on the image signal to be displayed, and obtaining the image signal to be displayed after noise reduction.

Further, the step of determining a corresponding noise reduction method according to the type, performing noise reduction processing on the image signal to be displayed, and obtaining the image signal to be displayed after noise reduction includes:

in a determination that the image signal to be displayed is an analog signal, performing noise reduction processing on the image signal to be displayed by low-pass filtering, and obtaining the analog signal after noise reduction; and converting the analog signal after noise reduction into a digital signal, performing noise reduction processing on the digital signal by wavelet transform filtering, and obtaining the image signal to be displayed after noise reduction.

Further, the step of determining a corresponding noise reduction method according to the type, performing noise reduction processing on the image signal to be displayed, and obtaining the image signal to be displayed after noise reduction includes:

in a determination that the image signal to be displayed is a digital signal, performing noise reduction processing on the image signal to be displayed by wavelet transform filtering, and obtaining the image signal to be displayed after noise reduction.

Further, subsequent to the step of adjusting a brightness of the image to be displayed according to the compensation intensity coefficient and the attribute value, the image brightness adjustment program, when executed by a processor, implements the following steps:

determining the adjusted local backlight brightness value according to the image to be displayed after adjusting the brightness, and displaying the image to be displayed according to the adjusted local backlight brightness value.

The specific implementation of the computer-readable storage medium of the present application is basically the same as the above embodiments of the image brightness adjustment method, and details are not described herein again.

It should be noted that in this article, the terms "include", "comprise" or any other variant thereof are intended to cover non-exclusive inclusion, so that a process, method, article or device that includes a series of elements includes not only those elements, but also other elements that are not explicitly listed, or elements inherent to such processes, methods, objects, or devices. Without more restrictions, the element defined by the sentence "comprise a . . . " does not exclude that there are other identical elements in the process, method, article or device that includes the element.

The sequence numbers of the above embodiments of the present application are for description only, and do not represent the advantages and disadvantages of the embodiments.

Through the description of the above embodiments, those skilled in the art can clearly understand that the methods in the above embodiments can be implemented by means of software plus a necessary general hardware platform, and of course, can also be implemented by hardware, but in many cases the former is the better implementation. Based on this understanding, the technical solution of the present application can be embodied in the form of a software product in essence or part that contributes to the existing technology, and the computer software product is stored in a storage medium (such as ROM/RAM, magnetic disk, optical disk) including several instructions to enable a terminal device (which may be a mobile phone, computer, server, air conditioner, or network device, etc.) to execute the methods described in the embodiments of the present application.

The above are only preferred embodiments of the present application and do not limit the patent scope of the present application. Any equivalent structure or equivalent process transformation made by the description and drawings of the present application, or directly or indirectly used in other related technical fields are similarly included in the patent protection scope of the present application.

What is claimed is:

1. An image brightness adjustment method, comprising the following steps:

subsequent to receiving an image signal to be displayed, determining a type of the image signal to be displayed;

determining a corresponding noise reduction method according to the type, performing noise reduction processing on the image signal to be displayed, and obtaining the image signal to be displayed after noise reduction;

comparing the image signal to be displayed before noise reduction with the image signal to be displayed after noise reduction, and obtaining a signal-to-noise ratio;

calculating a compensation intensity coefficient according to the signal-to-noise ratio, and determining an attribute value of each region of an image to be displayed; and adjusting a brightness of the image to be displayed according to the compensation intensity coefficient and the attribute value;

wherein the step of determining a corresponding noise reduction method according to the type, performing noise reduction processing on the image signal to be displayed, and obtaining the image signal to be displayed after noise reduction comprises:

in a determination that the image signal to be displayed is a digital signal, performing noise reduction processing on the image signal to be displayed by wavelet transform filtering, and obtaining the image signal to be displayed after noise reduction.

2. The image brightness adjustment method according to claim 1, wherein the attribute value comprises an original pixel brightness value of each region of the image to be displayed, a local backlight brightness value of each region of the image to be displayed, and a maximum backlight brightness value of each region of the image to be displayed.

3. The image brightness adjustment method according to claim 2, wherein the step of adjusting a brightness of the image to be displayed according to the compensation intensity coefficient and the attribute value comprises:
calculating a difference value between the maximum backlight brightness value and the local backlight brightness value;
calculating a brightness value to be compensated according to the difference value, the original pixel brightness value, the maximum backlight brightness value and the compensation intensity coefficient;
adding the brightness value to be compensated and the original pixel brightness value, and obtaining an adjusted brightness value of the image to be displayed; and
adjusting the brightness of the image to be displayed according to the adjusted brightness value.

4. The image brightness adjustment method according to claim 2, wherein in a determination that the attribute value is the local backlight brightness value, the step of determining an attribute value of each region of an image to be displayed comprises:
determining the original pixel brightness value of each region of the image to be displayed; and
determining the corresponding local backlight brightness value by the original pixel brightness value based on a pre-stored mapping table between the original pixel brightness value and the local backlight brightness value.

5. The image brightness adjustment method according to claim 1, wherein subsequent to the step of adjusting a brightness of the image to be displayed according to the compensation intensity coefficient and the attribute value, the method further comprises:
determining the adjusted local backlight brightness value according to the image to be displayed after adjusting the brightness, and displaying the image to be displayed according to the adjusted local backlight brightness value.

6. An image brightness adjustment system, comprising a memory, a processor, and an image brightness adjustment program stored on the memory and executable on the processor, the image brightness adjustment program, when executed by the processor, implements the following steps:
subsequent to receiving an image signal to be displayed, determining a type of the image signal to be displayed;
determining a corresponding noise reduction method according to the type, performing noise reduction processing on the image signal to be displayed, and obtaining the image signal to be displayed after noise reduction;
comparing the image signal to be displayed before noise reduction with the image signal to be displayed after noise reduction, and obtaining a signal-to-noise ratio;
calculating a compensation intensity coefficient according to the signal-to-noise ratio, and determining an attribute value of each region of an image to be displayed; and
adjusting a brightness of the image to be displayed according to the compensation intensity coefficient and the attribute value;
wherein the step of determining a corresponding noise reduction method according to the type, performing noise reduction processing on the image signal to be displayed, and obtaining the image signal to be displayed after noise reduction comprises:
in a determination that the image signal to be displayed is a digital signal, performing noise reduction processing on the image signal to be displayed by wavelet transform filtering, and obtaining the image signal to be displayed after noise reduction.

7. The image brightness adjustment system according to claim 6, wherein the attribute value comprises an original pixel brightness value of each region of the image to be displayed, a local backlight brightness value of each region of the image to be displayed, and a maximum backlight brightness value of each region of the image to be displayed.

8. The image brightness adjustment system according to claim 7, wherein the image brightness adjustment program, when executed by the processor, implements the following steps:
calculating a difference value between the maximum backlight brightness value and the local backlight brightness value;
calculating a brightness value to be compensated according to the difference value, the original pixel brightness value, the maximum backlight brightness value and the compensation intensity coefficient;
adding the brightness value to be compensated and the original pixel brightness value, and obtaining an adjusted brightness value of the image to be displayed; and
adjusting the brightness of the image to be displayed according to the adjusted brightness value.

9. The image brightness adjustment system according to claim 7, wherein in a determination that the attribute value is the local backlight brightness value, the image brightness adjustment program, when executed by the processor, implements the following steps:
determining the original pixel brightness value of each region of the image to be displayed; and
determining the corresponding local backlight brightness value by the original pixel brightness value based on a pre-stored mapping table between the original pixel brightness value and the local backlight brightness value.

10. An image brightness adjustment method, comprising the following steps:
subsequent to receiving an image signal to be displayed, determining a type of the image signal to be displayed;
determining a corresponding noise reduction method according to the type, performing noise reduction processing on the image signal to be displayed, and obtaining the image signal to be displayed after noise reduction;
comparing the image signal to be displayed before noise reduction with the image signal to be displayed after noise reduction, and obtaining a signal-to-noise ratio;
calculating a compensation intensity coefficient according to the signal-to-noise ratio, and determining an attribute value of each region of an image to be displayed; and
adjusting a brightness of the image to be displayed according to the compensation intensity coefficient and the attribute value;

wherein the step of determining a corresponding noise reduction method according to the type, performing noise reduction processing on the image signal to be displayed, and obtaining the image signal to be displayed after noise reduction comprises:
- in a determination that the image signal to be displayed is an analog signal, performing noise reduction processing on the image signal to be displayed by low-pass filtering, and obtaining the analog signal after noise reduction; and
- converting the analog signal after noise reduction into a digital signal, performing noise reduction processing on the digital signal by wavelet transform filtering, and obtaining the image signal to be displayed after noise reduction.

11. The image brightness adjustment method according to claim 10, wherein the attribute value comprises an original pixel brightness value of each region of the image to be displayed, a local backlight brightness value of each region of the image to be displayed, and a maximum backlight brightness value of each region of the image to be displayed.

12. The image brightness adjustment method according to claim 11, wherein the step of adjusting a brightness of the image to be displayed according to the compensation intensity coefficient and the attribute value comprises:
- calculating a difference value between the maximum backlight brightness value and the local backlight brightness value;
- calculating a brightness value to be compensated according to the difference value, the original pixel brightness value, the maximum backlight brightness value and the compensation intensity coefficient;
- adding the brightness value to be compensated and the original pixel brightness value, and obtaining an adjusted brightness value of the image to be displayed; and
- adjusting the brightness of the image to be displayed according to the adjusted brightness value.

13. The image brightness adjustment method according to claim 11, wherein in a determination that the attribute value is the local backlight brightness value, the step of determining an attribute value of each region of an image to be displayed comprises:
- determining the original pixel brightness value of each region of the image to be displayed; and
- determining the corresponding local backlight brightness value by the original pixel brightness value based on a pre-stored mapping table between the original pixel brightness value and the local backlight brightness value.

14. The image brightness adjustment method according to claim 10, wherein subsequent to the step of adjusting a brightness of the image to be displayed according to the compensation intensity coefficient and the attribute value, the method further comprises:
- determining the adjusted local backlight brightness value according to the image to be displayed after adjusting the brightness, and displaying the image to be displayed according to the adjusted local backlight brightness value.

15. An image brightness adjustment system, comprising a memory, a processor, and an image brightness adjustment program stored on the memory and executable on the processor, the image brightness adjustment program, when executed by the processor, implements the following steps:
- subsequent to receiving an image signal to be displayed, determining a type of the image signal to be displayed;
- determining a corresponding noise reduction method according to the type, performing noise reduction processing on the image signal to be displayed, and obtaining the image signal to be displayed after noise reduction;
- comparing the image signal to be displayed before noise reduction with the image signal to be displayed after noise reduction, and obtaining a signal-to-noise ratio;
- calculating a compensation intensity coefficient according to the signal-to-noise ratio, and determining an attribute value of each region of an image to be displayed; and
- adjusting a brightness of the image to be displayed according to the compensation intensity coefficient and the attribute value;

wherein the step of determining a corresponding noise reduction method according to the type, performing noise reduction processing on the image signal to be displayed, and obtaining the image signal to be displayed after noise reduction comprises:
- in a determination that the image signal to be displayed is an analog signal, performing noise reduction processing on the image signal to be displayed by low-pass filtering, and obtaining the analog signal after noise reduction; and
- converting the analog signal after noise reduction into a digital signal, performing noise reduction processing on the digital signal by wavelet transform filtering, and obtaining the image signal to be displayed after noise reduction.

16. The image brightness adjustment system according to claim 15, wherein the attribute value comprises an original pixel brightness value of each region of the image to be displayed, a local backlight brightness value of each region of the image to be displayed, and a maximum backlight brightness value of each region of the image to be displayed.

17. The image brightness adjustment system according to claim 16, wherein the image brightness adjustment program, when executed by the processor, implements the following steps:
- calculating a difference value between the maximum backlight brightness value and the local backlight brightness value;
- calculating a brightness value to be compensated according to the difference value, the original pixel brightness value, the maximum backlight brightness value and the compensation intensity coefficient;
- adding the brightness value to be compensated and the original pixel brightness value, and obtaining an adjusted brightness value of the image to be displayed; and
- adjusting the brightness of the image to be displayed according to the adjusted brightness value.

18. The image brightness adjustment system according to claim 16, wherein in a determination that the attribute value is the local backlight brightness value, the image brightness adjustment program, when executed by the processor, implements the following steps:
- determining the original pixel brightness value of each region of the image to be displayed; and
- determining the corresponding local backlight brightness value by the original pixel brightness value based on a pre-stored mapping table between the original pixel brightness value and the local backlight brightness value.

* * * * *